United States Patent [19]

Kapp et al.

[11] 4,382,440
[45] May 10, 1983

[54] SMOKE AND POLLUTANT FILTERING DEVICE

[76] Inventors: Nancy J. Kapp, 73 Drexel, La Grange, Ill. 60525; Charles H. Bennett, 8320 Russell, Utica, Mich. 48087

[21] Appl. No.: 244,904

[22] Filed: Mar. 18, 1981

[51] Int. Cl.³ .............................................. A62B 7/10
[52] U.S. Cl. ........................ 128/201.25; 128/205.28; 128/205.29; 55/316; 55/486
[58] Field of Search ................ 128/201.25, 202.26, 128/205.12, 205.27, 205.28, 205.29, 206.12, 206.17, 206.19; 55/DIG. 33, DIG. 35, 486, 316

[56] References Cited

U.S. PATENT DOCUMENTS

| 533,854 | 2/1895 | Loeb | 55/486 |
|---|---|---|---|
| 2,341,566 | 2/1944 | Monro | 128/207.11 |
| 2,583,304 | 1/1952 | Pipher | 128/201.25 |
| 3,884,227 | 5/1975 | Lutz et al. | 128/206.19 |
| 3,944,403 | 3/1976 | Simpson et al. | 55/DIG. 33 |

FOREIGN PATENT DOCUMENTS

| 1213252 | 3/1966 | Fed. Rep. of Germany | 128/205.27 |
|---|---|---|---|
| 2231708 | 1/1973 | Fed. Rep. of Germany | 128/201.25 |

*Primary Examiner*—Henry J. Recla
*Attorney, Agent, or Firm*—Lee, Smith & Jager

[57] ABSTRACT

A smoke and pollutant filtering device comprising a mask having a filter composed of a series of contiguous, serial layers of filtering material. The filter consists of front and rear gas permeable covers, a first filter layer of pressed vegetable matter, a second filter layer comprising a layer of activated charcoal adjacent a layer of aqua filter floss, a third filter comprising a gas permeable cloth situated between layers of pressed vegetable matter, and a fourth filter layer comprising an aqua filter floss. The first through fourth filter layers are sandwiched between the front and rear gas permeable covers. The filtering device is stitched together and mounted within a fire-retardant hood shaped to fit over a human head. Elastic bands are included in the hood to maintain the hood snugly about the head when worn.

14 Claims, 6 Drawing Figures

U.S. Patent      May 10, 1983      4,382,440
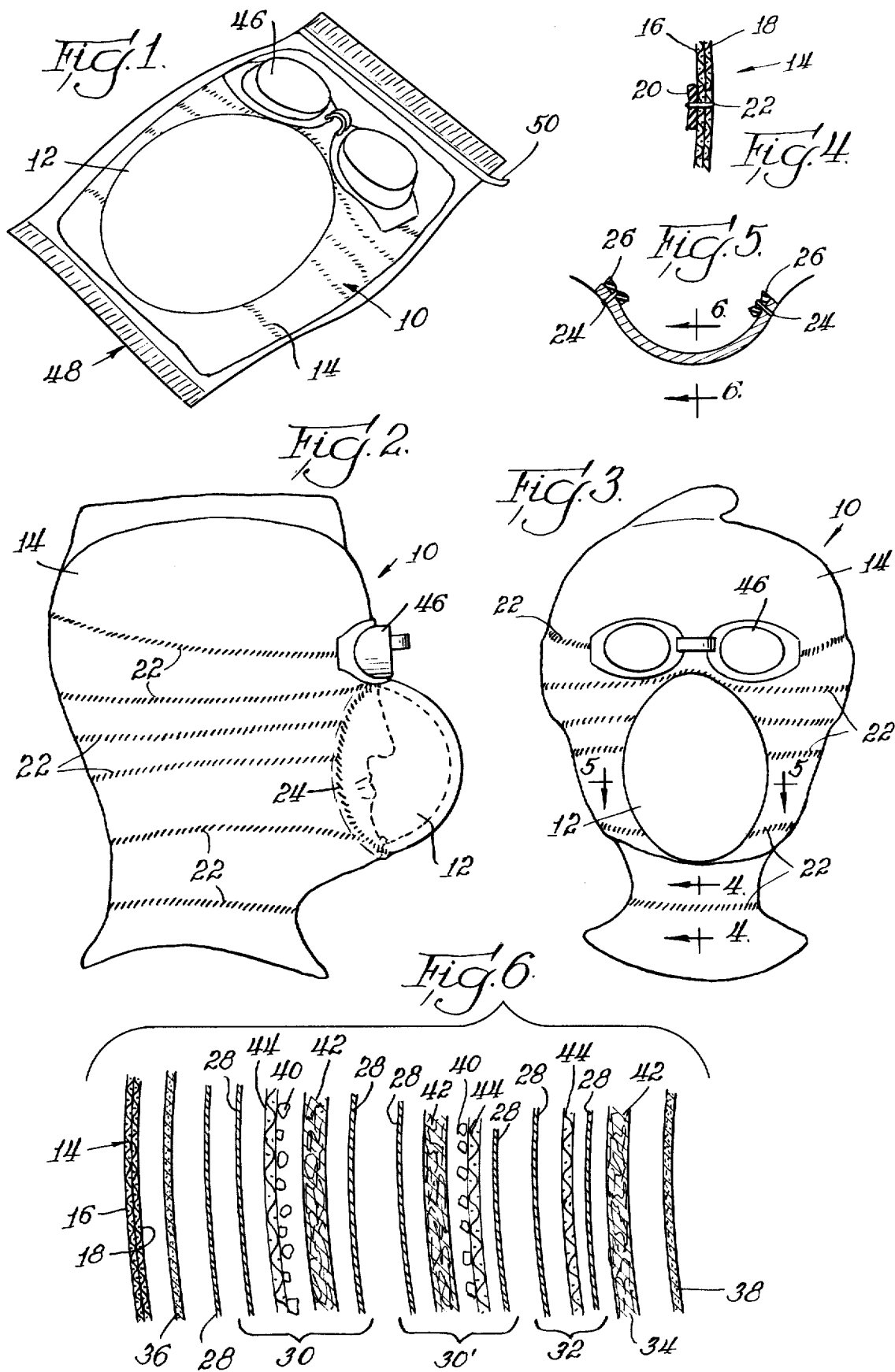

SMOKE AND POLLUTANT FILTERING DEVICE

BACKGROUND OF THE INVENTION

This invention pertains to filtering devices, and in particular a smoke and pollutant filtering device comprising a series of contiguous layers of filtering material.

On Nov. 22, 1980 the MGM Grand Hotel in Las Vegas, Nevada experienced a fire in its lower casino level which burned out of control for a short period of time. Toxic gases generated by the fire were drawn into the hotel ventilation system and spread throughout the sleeping areas of the hotel, killing many persons who died of smoke inhalation without being burned or experiencing any of the heat of the fire. Most, if not all, of those killed by smoke inhalation could have survived had they had access to a mask for filtering the deadly components from the smoke and gases which were spread throughout the hotel, giving the patrons sufficient time to find an exit to fresh air.

Many types of smoke and gas masks are well known and have been used for decades. Typical such masks include a pliable face portion with integral goggles to permit sight, and a canister of filtering material, such as activated charcoal, either forming a part of the mask or separately connected to the mask in order to permit air purification. Such masks are, however, bulky and cumbersome, and typically quite costly to manufacture. As a result, life saving masks are rarely, if ever, found in hotels and other public places where use in an emergency situation would undoubtedly save many lives.

SUMMARY OF THE INVENTION

The present invention provides a simple, yet inexpensive and effective smoke and pollutant filtering device which can be prepackaged and stored for future use when required. The filtering device comprises a serial arrangement of contiguous layers of filtering material, consisting of a front gas permeable cover, one or more layers of pressed vegetable matter, one or more layers of activated charcoal, one or more layers of aqua filter floss, and a rear gas permeable cover, the front and rear covers sandwiching the various layers of vegetable matter, activated charcoal and filter floss between them.

In a preferred embodiment, the filtering device comprises an arrangement of four filter layers located between the front and rear gas permeable covers. The first filter layer is composed of pressed vegetable matter and is situated adjacent the front cover. The second filter layer comprises a layer of activated charcoal adjacent a layer of aqua filter floss. The third filter layer comprises a gas permeable cloth situated between layers of pressed vegetable matter. The fourth filter layer comprises aqua filter floss. The first through fourth filter layers are bound between the front and rear covers in a conventional manner, such as by stitching.

The activated charcoal of the second filter level is maintained adjacent the aqua filter floss of the second filter layer by means of layers of pressed vegetable matter which sandwiches the filter floss and activated charcoal between them. A gas permeable cloth, such as cheese cloth, can be used to orient the activated charcoal against the aqua filter floss, if necessary. The cheese cloth does not perform a filtering function. Preferrably, the components of the second filter layer are stitched together about the outer periphery of the second filter layer to form a unitary filter layer.

Often, predetermined thicknesses of the activated charcoal and aqua filter floss of the second filter layer are required. Rather than increasing the bulk of the second filter layer, at least two of the second filter layers may be incorporated within the filtering device.

The filtering device preferrably is mounted within a fire-retardant hood shaped to fit over a human head. The hood is maintained snuggly about the head by means of a series of spaced elastic bands attached circumferentially about the hood.

The aqua filter floss is most active when moist. In accordance with the invention, the aqua filter floss is maintained moist by saturating the entire filtering device and fire-retardant hood and storing the device within a sealable package. So long as the package remains sealed, the moisture content therewithin is maintained constant, thus providing for indefinite storage of the filtering device until use is dictated.

BRIEF DESCRIPTION OF THE DRAWINGS

The invention is described in greater detail in the following description of the preferred embodiment, taken in connection with the drawings in which:

FIG. 1 is a perspective view of the invention when stored within a sealed package, FIG. 2 is a side elevational illustration of the invention when worn by a human user, FIG. 3 is a front elevational illustration of the invention as shown in FIG. 2, FIG. 4 is an enlarged cross-sectional illustration taken along lines 4—4 of FIG. 3, FIG. 5 is an enlarged cross-sectional illustration taken along lines 5—5 of FIG. 3, and FIG. 6 is an exploded and enlarged illustration taken along lines 6—6 of FIG. 5, showing in cross section one embodiment of a smoke filtering device according to the invention.

DESCRIPTION OF THE PREFERRED EMBODIMENT

Turning to the drawings, a smoke and pollutant filtering device, in combination with a fire-retardant hood, is generally designated at 10. A filtering device 12 is fastened within a hood 14 in registration with the nose and mouth of the user.

As best shown in FIGS. 2 and 3, the hood 14 is composed of a supple fabric material, having fire-retardant properties, which is shaped to fit over a human head. A desirable material for the hood has been found to be Nomex, an aramid fiber manufactured by E. I. Du Pont De Nemours and Co., Wilmington, Del. Nomex has been described by the Du Pont Company as a member of the aramid family of fibers which has good dimensional stability and excellent resistance to heat. The fiber does not melt and begins the degrade rapidly only at temperatures above 371° Centigrade (700° Fahrenheit). Nomex (aramid fiber) has been sold by the Du Pont Company at least since October, 1969.

The hood 14 can be one or more layers of fabric, as desired. As shown in FIG. 4, the hood 14 is comprised of a pair of contiguous layers 16 and 18 to achieve a desired thickness and heat transfer resistance.

To maintain the hood 14 snuggly about the wearer's head, the hood 14 includes a series of circumferentially spaced elastic strips 20 which are fastened by stitching 22 to the interior of the hood 14. As is well known, the elastic strips 20 are stitched in such a manner that the material of the hood 14 is gathered about the contour of the face of the user to provide a good fit.

As best shown in FIG. 5, the filtering device 12 is affixed within the interior of the hood 14 by means of stitching 24. If desired, and in order to permit better fitting of the filtering device 12 along the contours of the user's face, the outer peripheries of the filtering device 12, where affixed to the hood 14 by means of the stitching 24, may include a soft, pliable material or ring 26, such as foam rubber, to seal about the filtering device 12. Thus, the user's inhaled air is drawn through the filtering device 12, the ingress of unfiltered air being largely prevented by the sealing ring 26.

As best shown in FIG. 6, in a preferred embodiment, the filtering device 12 is composed of four basic filtering layers 28, 30, 32 and 34 sandwiched in series between front and rear covers 36 and 38. Layers 30 and 32 are composed of a plurality of sublayers as described in greater detail below.

The front and rear covers 36 and 38 are preferrably gas permeable particle filtering materials. It has been found that utilizing covers made of pressed polyester and cotter fiber formed in a molded fashion, in accordance with U.S. Pat. No. 3,064,329, produces a suitable cover.

The first filter layer 28 is a thin, flat sheet composed of pressed vegetable matter. The applicants have found that a suitable material is that commonly used as a coffee filter, comprising 99.5% wood fiber pulp which has been treated with urea. One suitable type is that manufactured by the James River Corporation, Kalamazoo, Mich., as a filter material for the Norelco Company for use with Norelco and other drip-type coffee makers. Other types of pressed vegetable matter can be employed, as required.

The second filter layer 30 is composed of a layer of activated charcoal 40 followed by a layer of aqua filter floss 42. The layers 40 and 42 are sandwiched between layers of pressed vegetable matter 28. If desired, a gas permeable cloth 44, such as cheese cloth, can be used to retain the particles of the activated charcoal 40 adjacent the aqua filter floss 42. The entire second filter layer 30 is stitched together to retain its integrity and form the layer in a unitary manner.

If desired, and in order to increase the time span of protection for the wearer of the invention 10, the thickness of the second filter layer 30 can be increased, or two or more of the second filter layers 30 can be used, as desired. As shown in FIG. 6, two of the second filter layers 30 and 30' have been illustrated as exemplary of duplication of the second filter layer 30. The filter layer 30' has been oriented as a mirror image of the filter layer 30, although such reversed orientation is not necessary.

The third filter layer 32 is composed of a gas permeable cloth 44 sandwiched between layers of pressed vegetable matter 28. The gas permeable cloth 44 provides no filtering function, and serves merely to maintain separation of the two layers of pressed vegetable matter 28.

The fourth and final filter layer 34 shown in FIG. 6 is composed of aqua filter floss 42. Suitable aqua filter floss, such as that commonly used as a purification filter material in home fish aquariums, is 100% polyester, which is water absorbent and non-irritating to human skin.

To provide for the user's sight while employing the invention 10, goggles 46 may be sewn or otherwise affixed to the hood 14, with the hood 14 being aperatured in alignment with the eye pieces of the goggles 46.

Since the invention employs an aqua filter floss 42, for the greatest effect, the floss 42 must be maintained in a moist state. One manner of doing so is sealing the invention within a severable package 48, as shown in FIG. 1. The moisture content of the aqua filter floss 42 is retained by the package 48 when sealed until such time as use of the invention 10 is required. To facilitate opening of the package 48, the package can include a tear strip 50 or the like to allow rapid removal of the invention from its package material. The invention is then worn over the head as shown in FIGS. 2 and 3, with the filtering device 12 in registration with the nose and mouth.

Various changes may be made to the invention, in addition to those described above, without departing from the spirit thereof or scope of the following claims.

We claim:

1. A smoke and pollutant filtering device comprising a series of contiguous layers of filtering material, consisting of
   a. front and rear gas permeable covers,
   b. a first filter layer of pressed vegetable matter adjacent said front cover,
   c. a second filter layer comprising a layer of activated charcoal adjacent a layer of aqua filter floss, and including means to maintain said layer of activated charcoal adjacent said layer of aqua filter floss,
   d. a third filter layer comprising a gas permeable cloth situated between layers of pressed vegetable matter, and
   e. a fourth filter layer comprising an aqua filter floss, said fourth filter layer being adjacent said rear cover.

2. The filtering device according to claim 1 in which said first through fourth filter layers are bound between said front and rear covers.

3. The filtering device according to claim 1 in which said means to maintain comprises a pair of layers of pressed vegetable matter between which said layers of aqua filter floss and activated charcoal are situated, and including means binding together the layers of said second filter layer.

4. The filtering device according to claim 3 in which said binding means comprises stitching about the outer periphery of said second filter layer.

5. The filtering device according to claim 1 in which said means to maintain comprises a layer of gas permeable cloth, said activated charcoal being situated between said gas permeable cloth and said layer of aqua filter floss.

6. The filtering device according to claim 1 including at least two of said second filter layers, said second filter layers being adjacent one another.

7. The filtering device according to claim 1 including a fire-retardant hood shaped to fit over a human head, said filtering device being mounted within said hood in registration with the nose and mouth.

8. The filtering device according to claim 7 including means to snuggly maintain said hood about the head.

9. The filtering device according to claim 8 in which said means to snuggly maintain comprises a series of spaced elastic bands situated circumferentially about and attached to said hood.

10. The filtering device according to claim 7 in which said aqua filter floss is maintained moist, and including a sealable package for said filtering device and hood to retain the moisture content of said aqua filter floss.

11. A smoke and pollutant filtering device comprising
   a. a fire-retardant hood shaped to fit over a human head,
   b. a filtering device comprising a series of contiguous layers of filtering material and situated within said hood in registration with the nose and mouth, said filtering device consisting of
      i. front and rear gas permeable covers, and at least three filter layers between said covers, said layers comprising
      ii. one filter layer of pressed vegetable matter adjacent said front cover,
      iii. another filter layer comprising a layer of activated charcoal adjacent a layer of aqua filter floss, and including means to maintain said layer of activated charcoal adjacent said layer of awua filter floss, and
      iv. a third filter layer comprising a gas permeable cloth situated between layers of pressed vegetable matter, and
   c. means to maintain a predetermined moisture content for said aqua filter floss when said filtering device is not in use.

12. A smoke and pollutant filtering device comprising a series of contiguous layers of filtering material, consisting of
   a. a front gas permeable cover,
   b. a first filter layer of pressed vegetable matter adjacent said front cover,
   c. a second filter layer comprising a layer of activated charcoal adjacent a layer of aqua filter floss, and including means to maintain said layer of activated charcoal adjacent said layer of aqua filter floss,
   d. a third filter layer comprising a gas permeable cloth situated between layers of pressed vegetable matter, and
   e. a rear gas permeable cover, said first, second and third filter layers being situated between said front and rear covers.

13. The filtering device according to claim 12 including a filter layer of aqua filter floss adjacent said rear cover.

14. The filtering device according to claim 12 including at least two of said second filter layers, said second filter layers being adjacent one another.

* * * * *